United States Patent
Nishikawa et al.

(10) Patent No.: US 6,906,877 B2
(45) Date of Patent: Jun. 14, 2005

(54) MAGNETIC TRANSFER METHOD FOR A HIGH-DENSITY MAGNETIC RECORDING MEDIUM

(75) Inventors: Masakazu Nishikawa, Kanagawa-ken (JP); Tadashi Yasunaga, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 340 days.

(21) Appl. No.: 10/163,357

(22) Filed: Jun. 7, 2002

(65) Prior Publication Data

US 2002/0186487 A1 Dec. 12, 2002

(30) Foreign Application Priority Data

Jun. 8, 2001 (JP) ....................................... 2001-173829

(51) Int. Cl.⁷ ................................................. G11B 5/86
(52) U.S. Cl. .............................. 360/17; 360/15; 360/16
(58) Field of Search ....................... 360/15–17; 728/694

(56) References Cited

U.S. PATENT DOCUMENTS

| | | | |
|---|---|---|---|
| 6,280,813 B1 * | 8/2001 | Carey et al. | 428/694 TS |
| 6,347,016 B1 * | 2/2002 | Ishida et al. | 360/17 |
| 6,391,430 B1 * | 5/2002 | Fullerton et al. | 428/694 TS |
| 6,469,848 B1 * | 10/2002 | Hamada et al. | 360/17 |
| 6,686,070 B1 * | 2/2004 | Futamoto et al. | 428/694 TS |

FOREIGN PATENT DOCUMENTS

| | | |
|---|---|---|
| EP | 1-059629 A2 | 12/2000 |
| JP | 63-183623 | 7/1988 |
| JP | 10-040544 | 2/1998 |
| JP | 10-269566 | 10/1998 |
| JP | 2001-56924 A | 2/2001 |
| JP | 2001-056921 | 2/2001 |
| JP | 2001-056922 | 2/2001 |
| JP | 2001-056925 | 2/2001 |
| JP | 2001-209935 | 8/2001 |
| WO | WO 01/37268 A1 | 5/2001 |

\* cited by examiner

*Primary Examiner*—Sinh Tran
*Assistant Examiner*—Glenda P. Rodriguez
(74) *Attorney, Agent, or Firm*—Sughrue Mion, PLLC

(57) ABSTRACT

A method of performing an accurate magnetic transfer to a high-density slave medium having two magnetic layers and utilizing antiferromagnetic coupling. The magnetic layer, which has been initially magnetized in advance, of a magnetic recording medium is conjoined with the data bearing surface of a master medium. A transfer magnetic field is applied to the conjoined body in the circumferential direction of the track of the first magnetic layer in the direction opposite the initial magnetization direction of the second magnetic layer. At this time, the thickness of the magnetic layer of the master medium, the permeability (material) of the magnetic layer, the form of the patterned magnetic layer, the separation distance between the master medium and the magnetic recording medium, etc., may be controlled so that the magnetic field of the transfer magnetic field does not effect the magnetization state of the first magnetic layer.

9 Claims, 2 Drawing Sheets

MAGNETIC TRANSFER METHOD FOR A HIGH-DENSITY MAGNETIC RECORDING MEDIUM

BACKGROUND OF THE INVENTION

1. Field of the Invention

The present invention relates to a magnetic transfer method of magnetically transferring a predetermined data such as servo data or the like, and in particular to a method of performing magnetic transfer to a high-density magnetic recording medium.

2. Description of the Related Art

Generally speaking, with regard to magnetic recording mediums, there is a demand for increased storage capacity and low cost. Further desired are so-called high-speed access mediums, which are capable of advantageously reading out the data of a specified location in a short time. At present, a new type of magnetic recording medium, which comprises two magnetic layers separated by a coupling layer formed of ruthenium, utilizing antiferromagnetic coupling (AFC) to realize a remarkable increase in recording capacity is being developed. This new media type is sometimes referred to as a "Synthetic Ferromagnetic Media" (SF media). AFC media is characterized by each of the magnetic layers having respectively opposite magnetization directions, by providing a nonmagnetic coupling layer between the two magnetic layers. Examples of high-density magnetic recording mediums in which the thermal stability of the antiferromagnetic coupling between two magnetic layers can be improved and the recording density further increased have been proposed in Japanese Unexamined Patent Publication Nos. 2001-56921, 2001-56922, and 2001-56925.

With regard to this type of high-density recording medium, so-called tracking servo technology, wherein the magnetic head accurately scans the track width to achieve a high S/N ratio, is utilized in the same method as for the magnetic recording mediums such as the conventional hard disks or flexible disks used in ZIP (Iomega) drives or the like.

The servo data required to implement the tracking servo technology must be "preformatted", that is, recorded on the disk in advance when the disk is manufactured. At present, a preformat such as that described above employs a specialized servo recording apparatus, and is formed by causing the magnetic head to approach the disk, and writing the signal one track at a time while the disk is being rotated. Because the servo data is recorded for one disk at a time, on one track at a time, a significant amount of time is required for the preformatting operation, giving rise to a problem with respect to the manufacturing efficiency.

Further, although the magnetic data of the AFC media is recorded and reproduced by scanning the track thereof with a magnetic head in the same method as for conventional magnetic recording media, because the size of the magnetic head is relatively large in comparison to a magnetization region, a magnetic field producing noise on the inverse magnetization portions is inadvertently applied thereto. Still further, because the magnetic field is applied not only to the upper magnetic layer but also to the lower layer of the two magnetic layers, there is a limit to the recording accuracy of the AFC media due to problems such as the disorder caused in the magnetization state of the lower magnetic layer; therefore, a reproduction signal having a favorable S/N ratio cannot be obtained therefrom. A favorable servo reproduction signal must be obtained in order to accurately control the track position. If the S/N ratio of the servo reproduction signal of a servo signal that has been preformatted by use of a servo recording apparatus is not favorable, such a situation becomes an obstacle to the performance of a favorable tracking servo.

An accurate and efficient preformatting method, wherein a pattern bearing servo data, which has been formed on a master medium, is magnetically transferred to a magnetic recording medium, has been proposed in Japanese Unexamined Patent Publication Nos. 63(1988)-183623, 10(1998)-40544, and 10(1998)-269566.

According to these magnetic transfer technologies, a master medium having an uneven pattern corresponding to the data that is to be transferred to a magnetic recording medium (a slave medium) is prepared. By bringing this master medium into close contact with a slave medium to form a conjoined body, and applying a transfer magnetic field thereto, a magnetic pattern corresponding to the data (e.g., a servo signal) borne on the master medium is transferred to the slave medium. The preformatting can be performed without changing the relative positions of the master medium and the slave medium that is, while the two media remain relatively static. Therefore not only is it possible to perform an accurate recording of the preformat data, it becomes possible to advantageously do so in an extremely short time. Accordingly, it can be considered that this method is applicable in transferring a magnetic pattern to AFC media, also.

However, the magnetic transfer methods proposed thus far have presumed that the transfer would be performed to a conventional magnetic layer formed of single magnetic layer; the performance of a transfer to AFC media comprising a magnetic layer, which is a two-layer magnetic layer magnetically coupled by antiferromagnetic coupling, has not been considered. Because the structure of the magnetic layer of a conventional magnetic recording medium and the magnetic layer of an AFC medium are different, if a conventional magnetic transfer method is employed to perform a magnetic transfer to an AFC medium, an accurate, favorable transfer is not obtained; therefore, there is a demand for a magnetic transfer method tailored to the properties of AFC media.

SUMMARY OF THE INVENTION

The present invention has been developed in view of the forgoing circumstances, and it is an object of the present invention to provide a magnetic transfer method capable of favorably transferring a magnetic pattern to AFC media.

The magnetic transfer method according to the present invention comprises performing the steps of: conjoining the magnetic layer, which is formed in a pattern corresponding to the data to be transferred to the magnetic layer of a magnetic recording medium, of a magnetic master medium with the laminated magnetic recording layer of a high-density magnetic recording medium comprising a substrate, a first magnetic layer formed on the substrate, a nonmagnetic coupling layer formed on the first magnetic layer, and a second magnetic layer formed on the nonmagnetic coupling layer, which has been magnetized in advance so that the magnetization of said first magnetic layer and said second magnetic layer are uniform and oriented mutually antiparallel, to form a conjoined body; and applying a transfer magnetic field to the conjoined body in the direction opposite the direction of the magnetization of the second magnetic layer to magnetically transfer the pattern corresponding to the data.

Here, the expression "magnetized in advance so that the magnetization of each of said first magnetic layer and said second magnetic layer is uniform and oriented mutually antiparallel," refers to the performance of the magnetization, over all magnetization regions, so that the first magnetic layer is magnetized in one direction and the second magnetic layer is magnetized in the direction opposite said direction of the magnetization of the first magnetic layer.

The expression "conjoining the magnetic layer, which is formed in a pattern corresponding to the data to be transferred, of a magnetic master medium with the magnetic recording layer of a high-density magnetic recording medium" refers to not only the bringing into close contact and maintaining a uniform distance separating the respective opposed surfaces of the master medium and the magnetic recording medium, but also to the bringing into complete contact of said respective surfaces.

The referent of "the data to be transferred to the magnetic recording layer of a magnetic recording medium" may be servo data, for example, but not limited thereto.

In particular, by passing the transfer magnetic field through the second magnetic layer and the magnetic layer of the master medium, the second magnetic layer can be magnetized in a pattern form without affecting the magnetization state of the first magnetic layer; wherein, it is desirable that through the coupling by the nonmagnetic coupling layer between the second magnetic layer magnetized in a pattern form and the first magnetic layer, the first magnetic layer is magnetized in an antiparallel direction to the patterned magnetization of the second magnetic layer.

The expression "magnetized in a pattern form" refers to the magnetization of each region of the magnetic layer in either the direction of the initial magnetization or the direction opposite thereto, so that the entirety thereof forms a pattern. The expression "the first magnetic layer is magnetized in an antiparallel direction to the patterned magnetization of the second magnetic layer" refers to the performance of the magnetization so that the magnetization direction of each region of the first magnetic layer is oriented in the opposite direction of the magnetization direction of each region of the second magnetic layer corresponding to each said of the first magnetic layer.

Note that the referent of "without affecting the magnetization state of the first magnetic layer" is not that the magnetic field does not enter the first magnetic layer, but that no direct change is caused to the magnetization of the first magnetic layer even if said magnetic field enters the first magnetic layer. Further, the thickness of the magnetic layer of the master medium, the permeability (material) of the magnetic layer of the master medium, the separation distance between the master medium and the magnetic recording medium, the form of the patterned magnetic layer of the master medium, etc., may be controlled so that the magnetic field of the transfer magnetic field does not effect the magnetization state of the first magnetic layer.

According to the magnetic transfer method of the present invention: because a transfer magnetic field is applied to a conjoined body formed by conjoining the magnetic layer, which is formed in a pattern corresponding to the data to be transferred to the magnetic layer of a magnetic recording medium, of a magnetic master medium with the magnetic recording layer of a high-density magnetic recording medium which has been magnetized in advance so that the magnetization of the first magnetic layer and the second magnetic layer thereof is uniform and oriented mutually antiparallel, in the direction opposite the direction of the magnetization of the second magnetic layer to magnetically transfer the pattern corresponding to the data, the magnetic inversion of the small magnetization regions can be performed more accurately in comparison to a magnetic recording method using a magnetic head, whereby disorder in the inverted magnetization portions can be suppressed; further, in comparison to using a magnetic head, because the depth to which the magnetic field penetrates the magnetic recording medium can be more easily controlled, the effect of the transfer magnetic field on the first magnetic layer can be reduced, whereby the disorder caused in the magnetization of the first magnetic layer by the transfer magnetic field can be suppressed. That is to say, because disorder of the magnetization can be reduced, the noise level of the reproduction signal can be reduced as a result; whereby it becomes possible to provide a high-density magnetic recording medium capable of more accurately implementing tracking servo technology.

In particular, by passing the transfer magnetic field through the second magnetic layer and the magnetic layer of the master medium so that said magnetic field does not affect the magnetization state of the first magnetic layer, the second magnetic layer can be magnetized in a pattern form: wherein, if the magnetization of the first magnetic layer is caused to be oriented antiparallel in relation to the patterned magnetization of the second magnetic layer through the coupling by the nonmagnetic coupling layer on the first magnetic layer and the second magnetic layer, the first magnetic layer, which has been magnetized in advance, receives no effect from the transfer magnetic field, which is a potential source of disturbance; and because the inversion magnetization of the first magnetic layer becomes thermally stabilized by only the action of the magnetization of the second magnetic layer and the nonmagnetic coupling therewith, an accurate signal pattern can be transferred.

Further, if the data borne by the magnetic transfer master medium of the present invention are servo signals, a favorable transfer of the servo signals can be easily performed onto a high-density magnetic recording medium; whereby preformatted magnetic recording mediums can be manufactured efficiently.

DESCRIPTION OF THE PREFERRED EMBODIMENTS

Hereinafter a preferred embodiment of the present invention will be explained with reference to the attached drawings. First, a magnetic transfer master medium used in performing magnetic transfers, and a magnetic recording medium, which is slave medium, for receiving the magnetic transferal of predetermined data from the magnetic transfer master medium will be explained.

Figure 1:
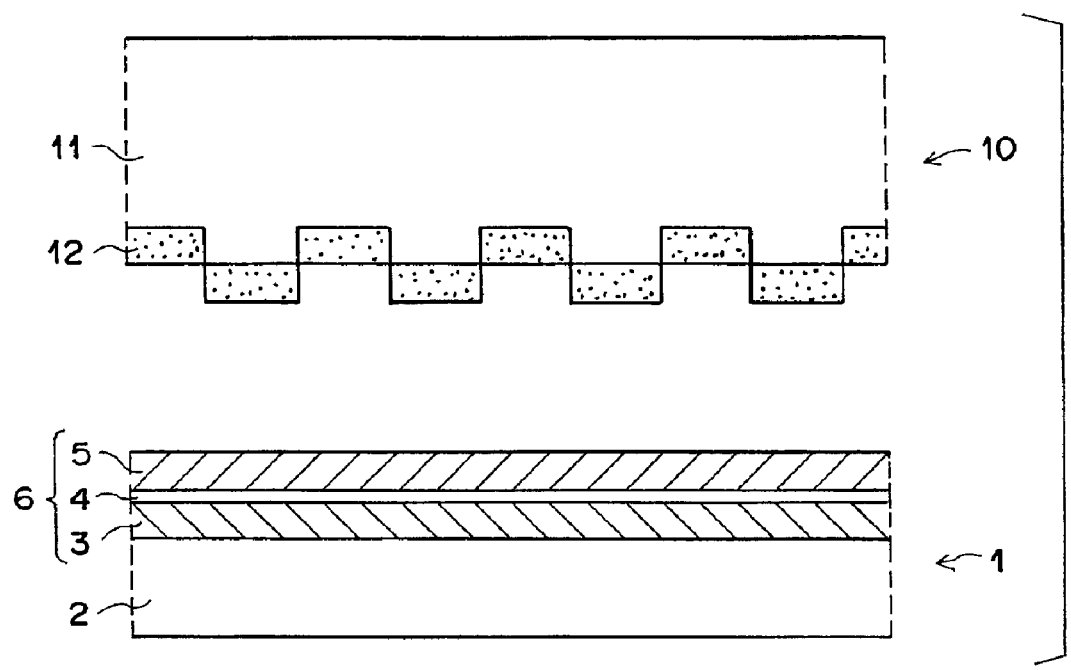
FIG. 1 is a cross-sectional view of the main parts of a master medium and a magnetic recording medium.

FIG. 1 is a cross-sectional view of the main parts of a magnetic recording medium 1 and a master medium 10. The magnetic recording medium 10 is an AFC recording medium comprising a magnetic layer 6 having a substrate 2, on which are formed at least a first magnetic layer 3, a nonmagnetic coupling layer 4, and a second magnetic layer 5. Although the substrate 2 shown in FIG. 1 is provided on only one surface thereof with a magnetic layer 6, a magnetic layer may be provided on both surfaces of the substrate 2. The first magnetic layer 3 and the second magnetic layer 5 are provided with a property, due to the antiferromagnetic coupling via the nonmagnetic coupling layer 4, whereby the magnetization of said magnetic layers is oriented in opposite directions. Note that substrate 11 can be a hard base or a flexible base.

Further, the master medium 10 is formed of as an annular disk, and comprises a substrate 11 provided a surface thereof with an uneven pattern corresponding to the data (e. g., servo signals) that is to be transferred to the magnetic layer 6 of the magnetic recording medium 1, and a magnetic layer 12 formed over the uneven pattern of the substrate 11. By forming the magnetic layer 12 over the uneven pattern, the master medium 10 is provided with a patterned magnetic layer (a soft magnetic layer) as a result. Note that the master medium 10 is not limited to being of the configuration according to the current embodiment: the magnetic layer can be formed on only the upper surface of the protrusion portions of the uneven pattern; or a master medium having a flat surface formed by filling in the depression portions of the uneven pattern formed thereon with a magnetic layer, thereby forming a pattern corresponding to the data to be transferred as a result, can also be employed. For cases in which the substrate 11 is formed of a ferromagnetic material such as Ni or the like, it is not necessarily required that the magnetic layer be provided; the uneven pattern provided on the surface of the substrate serves as the equivalent of the "patterned magnetic layer."

Still further, if a protective film such as Diamond-Like Carbon (DLC) or the like is coated on the topmost layer, this protective film improves the contact durability, enabling the performance of multiple magnetic transfers. Also, a silicon layer applied by a sputtering process or the like can be provided as an under layer of the DLC protective layer in order to improve the contact characteristics.

The magnetic transfer is performed in the state wherein the surface of the magnetic recording medium 1 and the magnetic layer 12 of the master medium 10 are brought into and maintained in complete contact, or in the state wherein said magnetic layer 6 and said magnetic layer 12 are opposed and brought into proximity to each other, and maintained at a uniform separation distance.

Figure 2A:
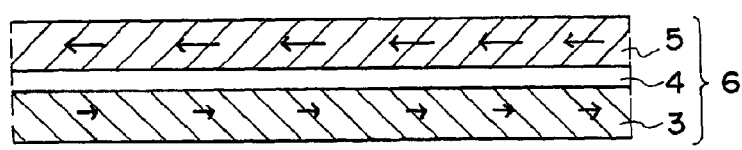
FIGS. 2A, 2B, and 2C are views illustrating the basic processes of the magnetic transfer method according to the present invention.
Figure 2B:
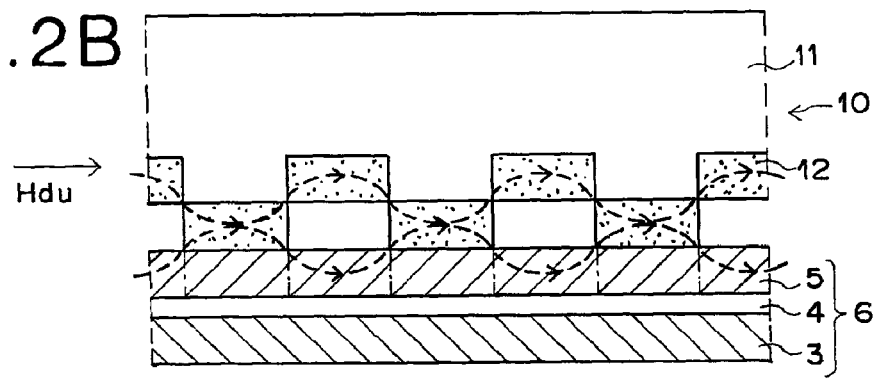
Figure 2C:
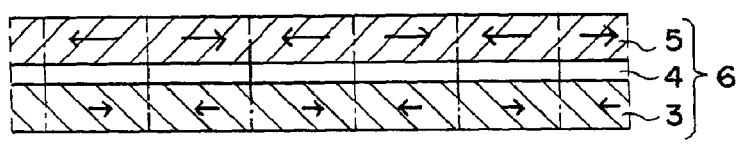

FIGS. 2A, 2B, and 2C are drawings illustrating the basic processes of this magnetic transfer method. FIG. 2A shows a magnetic recording medium that has been subjected to an initial magnetization process. FIG. 2B illustrates the process wherein the master medium and the magnetic recording medium are brought into close contact to form a conjoined body and a transfer magnetic field Hdu is applied thereto. FIG. 2C illustrates the magnetization state of the magnetic recording medium after the magnetic transfer has been performed; each of the FIGS. 2A, 2B, and 2C are cross-sectional views of a portion of the track along the lengthwise direction thereof. Note that in FIGS. 2A, 2B, and 2C, as to the magnetic recording medium 1, only the magnetic layer 6 thereof is shown.

As shown in FIG. 2A, first, the first magnetic layer 3 and the second magnetic layer 5 are subjected to the initial magnetic process. In this case, the initial magnetization is performed so that the magnetization direction of the first magnetic layer 3 is unidirectional along the circumferential direction of the track, and the magnetization direction of the second magnetic layer 5 is oriented antiparallel to that of the first magnetic layer 3.

Then, as shown in FIG. 2B, the surface 6 of the magnetic recording medium 1 and the data bearing surface formed by the magnetic layer 12 coated over the uneven pattern of the substrate 11 of the master medium 10, are brought into close contact to form a conjoined body, and a transfer magnetic field (Hdu) is applied in the circumferential direction of the track of the first magnetic layer 3 in the direction opposite the initial magnetization direction of the second magnetic layer 5. At this time, the thickness of the magnetic layer 12 of the master medium 10, the permeability (material) of the magnetic layer 12, the form of the patterned magnetic layer 12, the separation distance between the master medium 10 and the magnetic recording medium 1, etc., may be controlled so that the transfer magnetic field Hdu does not effect the magnetization state of the first magnetic layer.

The magnetization of each of the regions of the first magnetic layer 3, as shown in FIG. 2C, is oriented antiparallel with respect to that of each corresponding small region of the second magnetic layer 5, by way of the antiferromagnetic coupling of the nonmagnetic coupling layer 4. In this way, the magnetic layer is thermally stabilized in a state in which the magnetization of each corresponding region of the first magnetic layer 3 and the second magnetic layer 5 is oriented in opposite directions.

If the above described magnetic transfer method is utilized for transferring a magnetic pattern to an AFC media such as that described above, a magnetic pattern corresponding to a predetermined data can be accurately transferred; in particular, if the transfer data is servo signals, the tracking performance is improved.

What is claimed is:

1. A magnetic transfer method comprising the steps of:

providing (i) a high-density magnetic recording medium comprising a substrate and a magnetic recording layer, said magnetic recording layer comprising a first magnetic layer, a nonmagnetic coupling layer and a second magnetic layer which are stacked in an order of the first magnetic layer, the nonmagnetic coupling layer and the second magnetic layer, on the substrate, said first magnetic layer and said second magnetic layer having been previously magnetized uniformly in mutually antiparallel directions, and ii) a magnetic master medium having a magnetic layer which is formed in a pattern corresponding to data to be transferred to the magnetic recording layer of the magnetic recording medium, and applying a transfer magnetic field to the magnetic recording medium and the magnetic master medium in a direction opposite to the direction in which the second magnetic layer has been magnetized while the magnetic recording medium and the magnetic master medium are positioned so that the magnetic recording layer of the magnetic recording medium faces the magnetic layer of the magnetic master medium to effect magnetic transfer of said pattern.

2. A magnetic transfer method as defined in claim 1, wherein said data are servo signals.

3. A magnetic transfer method as defined in claim 1, wherein the second magnetic layer is magnetized in a pattern by passing a magnetic flux of the transfer magnetic field through the magnetic layer of the master medium and the second magnetic layer of the recording medium in such a manner that said magnetic flux does not affect the magnetization state of the first magnetic layer; and wherein the first magnetic layer is magnetized in a pattern antiparallel to the pattern in which the second magnetic layer is magnetized through an interaction between the second magnetic layer magnetized in the form of the pattern and the first magnetic layer via the nonmagnetic coupling layer.

4. A magnetic transfer method as defined in claim 3, wherein said data are servo signals.

5. A magnetic transfer method as defined in claim 3, wherein at least one of a thickness of the magnetic layer of the magnetic master medium, a permeability of the magnetic layer, a form of the pattern of the magnetic layer, a separation distance between the magnetic master medium and the magnetic recording medium, is controlled so that the transfer magnetic field does not directly effect the magnetization state of the first magnetic layer.

6. A magnetic transfer method as defined in claim 1 further comprising a protective film disposed over the magnetic layer of the magnetic master medium, toward the magnetic recording medium.

7. A magnetic transfer method as defined in claim 6, wherein the protective film is carbon-based.

8. A magnetic transfer method as defined in claim 6, wherein the protective film is a diamond-like carbon.

9. A magnetic transfer method as defined in claim 8, wherein a silicon layer is disposed between the protective film and the magnetic layer of the magnetic master medium.

* * * * *